United States Patent [19]
Masson et al.

[11] 3,994,329
[45] Nov. 30, 1976

[54] SAFETY TIRE FOR VEHICLES

[75] Inventors: Yves Masson, Paris; Jack Benard, Asniere, both of France

[73] Assignee: Pneumatiques, Caoutchouc Manufacture et Plastiques Kleber-Colombes, France

[22] Filed: May 27, 1975

[21] Appl. No.: 580,824

[30] Foreign Application Priority Data
May 24, 1974 France .............................. 74.18164

[52] U.S. Cl. ............................. 152/353 R; 152/310; 152/329; 152/330 RF; 152/354; 152/361 R
[51] Int. Cl.² .................. B60C 13/00; B60C 17/00; B60C 9/02
[58] Field of Search ........................... 152/352–354, 152/310–314, 329, 339, 331, 330 RF, 187, 361 R

[56] References Cited
UNITED STATES PATENTS

| | | | |
|---|---|---|---|
| 816,889 | 4/1906 | Van der Stichelen | 152/353 R |
| 2,563,788 | 8/1951 | Keefe | 152/330 RF |
| 2,620,845 | 12/1952 | Lord | 152/352 |
| 2,735,471 | 2/1956 | McLean | 152/187 |
| 3,022,810 | 2/1962 | Lambe | 152/310 |

*Primary Examiner*—Drayton E. Hoffman
*Attorney, Agent, or Firm*—Craig & Antonelli

[57] ABSTRACT

A safety tire comprising a tread (11), spaced beads (12) and sidewalls connecting the beads to the sides of the tread by forming under the tread a central inflatable chamber, each sidewall comprising an outside wall convex towards the outside and an inside partition convex towards the inside delimiting between each other lateral chambers distinct from the central inflatable chamber, characterized in that said lateral chambers are filled with a flexible cellular material rendering the sidewalls suitable to support the load of the wheel with a limited sagging of the tire in case of the deflating of the central chamber.

19 Claims, 6 Drawing Figures

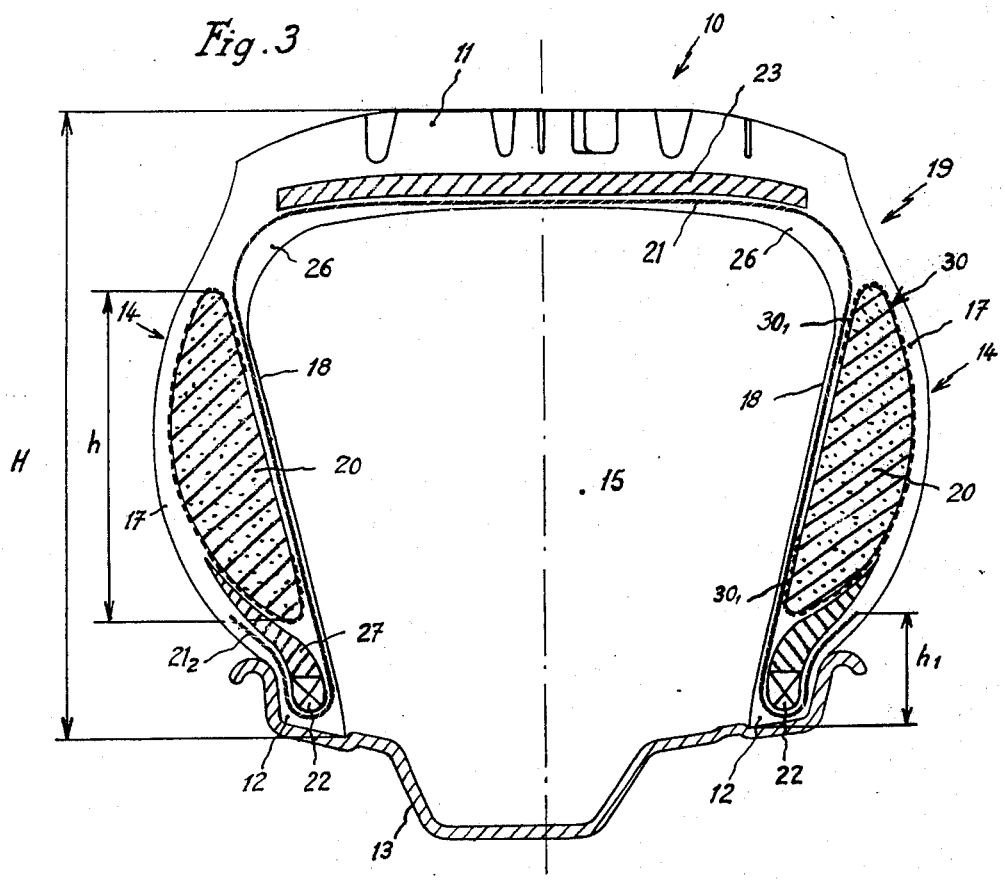
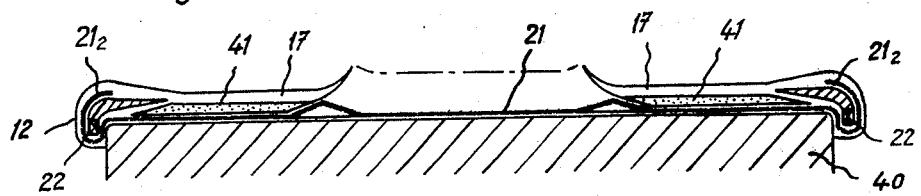
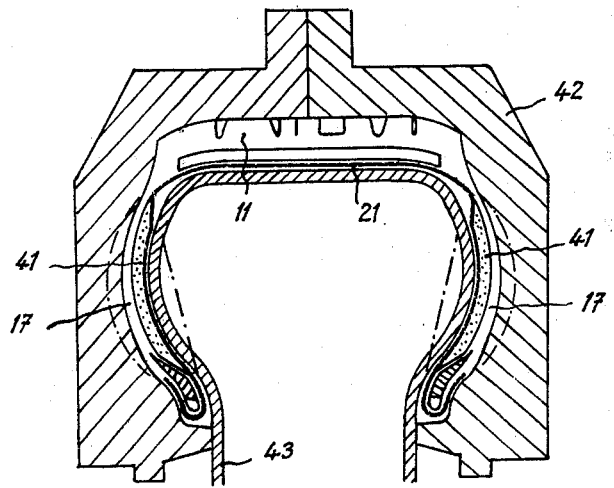

SAFETY TIRE FOR VEHICLES

The present invention relates to a safety tire for vehicles, of the type comprising under the tread a chamber or tight cavity inflated with air under pressure in order to maintain the wheel in normal driving condition and comprising means for preventing the complete sagging of the tire in the case of accidental deflating of this chamber.

It has already been proposed to have safety tires, in which the internal cavity of the casing is completely filled with a flexible alveolar (cellular) material. These tires are practically puncture-proof, but they are also generally hard and uncomfortable. And more, they can usually not be used at high speeds due to the excessive heating created by the repeated deformations to which this alveolar filling is exposed. It has also been proposed to place in the inside of the tire, at a distance from the tread, annular bands of rubber or of a flexible alveolar material which are supported by the rim and only intervene in order to limit the sagging of the tire in the case of a blow-out. But here, too, the rolling of the partially sagged tire creates rapidly an excessive heating due to the friction of the inside walls of the tire over the surface of the band. Also, the partially sagged tire floats laterally with regard to the inside band and at the rim in such a way that its directing power is in this stage very bad.

It has also been proposed to divide the inside space of the tire into several compartments inflated independently from each other, so that a blow-out can only affect one or two; whereas the others limit the sagging and thereby conserving a certain directing power for the tire. In the meantime, with the difficulties of manufacturing, these tires require a multiplicity of valves to allow the inflation of the independent compartments which is very inconvenient for the surveillance and the maintenance of the inflation pressures.

It is the objective of the invention to avoid these aforementioned inconveniences and to propose a safety tire presenting before bursting (blow-out) the majority of the important characteristics of an ordinary tire from the viewpoint of comfort, driving at high speed, simplicity of the surveillance and the maintenance of its pressure of inflation, easy mounting on regular standard rims and the possibility of manufacturing at an acceptable price with the classical materials of the tire industry. It is also an objective of the invention that in the case of bursting this safety tire does not sag completely over the rim, that it conserves a sufficient directing power and that in this stage it only creates small heating, so that it assures the continuation of its almost normal operation, thereby allowing the vehicle, which is equipped with this tire, to terminate its trip or at least to reach a far-away repair station in good condition.

Generally, a safety tire according to the invention comprises a tread, spaced beads, and sidewalls connecting the beads with the sides of the tread, thereby designing under the tread a central inflatable chamber or capacity, each sidewall comprising two walls or spaced partitions joining each other on the top and at the bottom of the sidewall delimiting between themselves lateral chambers separate from the central inflatable chamber, the lateral chambers being filled with a flexible cellular material rendering the sidewalls suitable to support the load of the wheel with a limited sagging of the tire in the case of deflating of the central chamber.

In the following, the invention is described in more detail by referring to the attached drawings, in which:

FIGS. 3 and 4 represent in cross-section two other embodiments; and

FIGS. 5 and 6 are schematical views showing the manufacture of a tire according to the invention.

Figure 1:
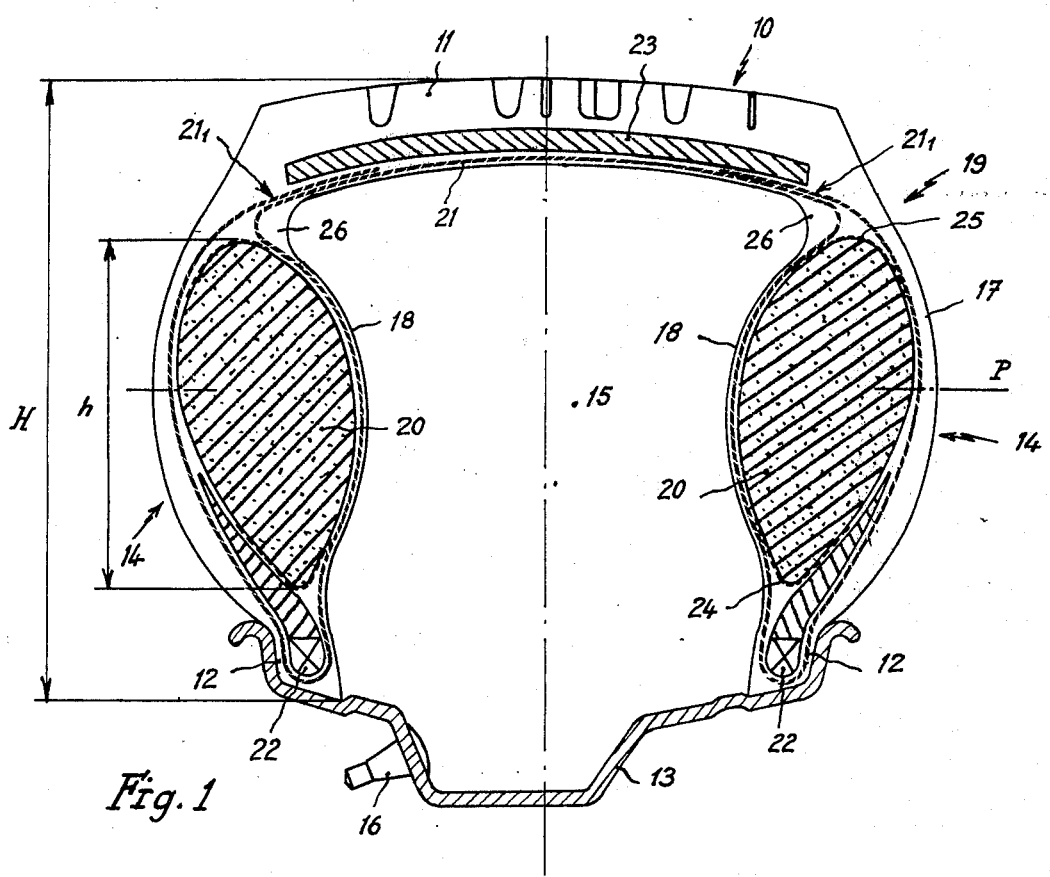
FIGS. 1 and 2 represent in cross-section a first embodiment of the tire according to the invention in the stage of reposing mounted on the rim and the form of this said tire under a normal charge (load)
Figure 2:
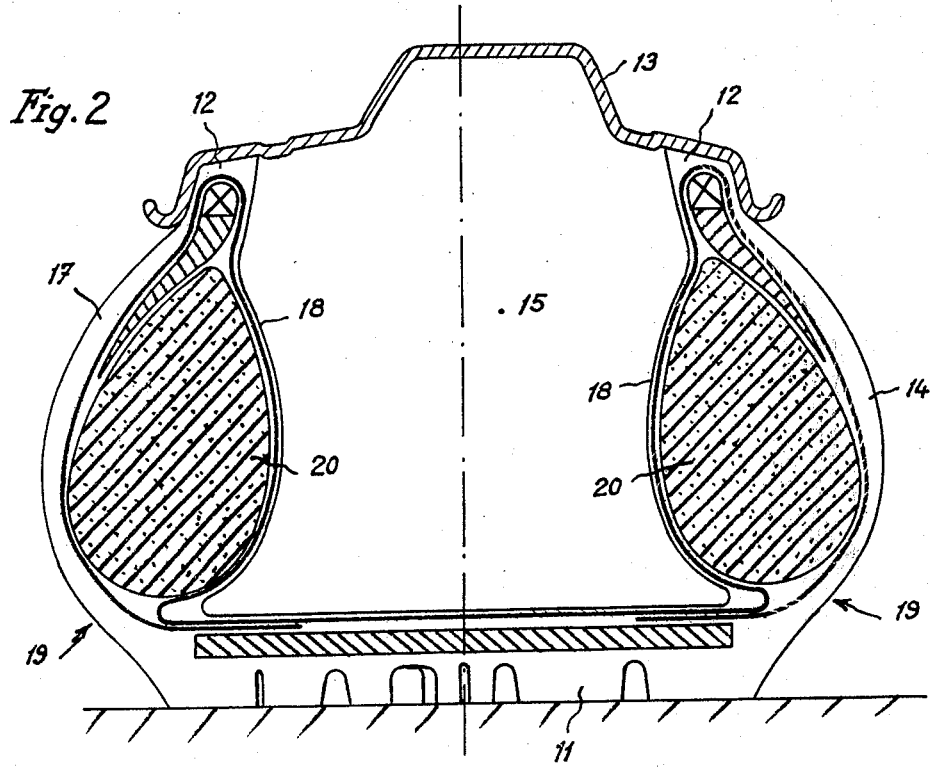

The tire illustrated in the FIGS. 1 and 2 comprises a top zone 10 itself comprising a tread 11; spaced beads 12 serving to maintain the tire in the position mounted on the rim 13 of the wheel and sidewalls 14 connecting the beads 12 to the lateral sides of the top zone 10, thereby defining under the same an inside chamber or central capacity 15 which can be inflated with air under pressure by the single valve 16 of the wheel. Each sidewall 14 comprises an outside wall 17 being convex towards the outside and an inside partition 18 being convex towards inside each joining the other at the top and at the bottom of the sidewall following two parallel circles, the one situated a little bit over the edges of the rim, and the other situated at the point of the shoulder 19. The wall 17 and the partition 18 delimit between themselves the annular lateral chambers 20 of a general bi-convex section, that are separate from the central chamber 15 and extend approximately on both sides of the plane P situated in the middle of the height of a section of the tire and following a height $h$ approximately equal to half of the height $H$ of the section. These lateral chambers 20 are filled with a flexible alveolar (cellular) material in a way to maintain the walls 17–18 of the lateral separated chambers from each other by giving them the illustrated form. Preferably, this flexible cellular material adheres to the inside walls of the lateral chambers 20.

FIG. 2 shows the form taken by the tire of the FIG. 1 under load, in the zone where it is in contact with the ground and in normal driving condition. It can be seen that the tread 11 initially slightly bulging goes flat at contact with the ground and that the sidewalls 14 are slightly bending mainly in the zone of the shoulders 29 included between the sides of the tread 11 and the radially external zone at the joining of the walls 17–18. In this stage the wheel is mainly supported by the pressure of the inflation air in the central chamber 15 which balances the supported load by exposing the tread and the sidewalls of the tire to the tension strains as in an ordinary tire. Due to the fact that the deflection of the sidewalls 14 is mainly located in the zone of the shoulders 19, radially outside of the lateral chambers 20, the cellular material filling up the chambers works little in the repeated deflections and has little tendency to heat. The tire can therefore be used in normal conditions. The cellular filling in the lateral chambers 20 does no longer impair sensibly the flexibility of the sidewalls 14 in the radial direction so that the tire remains comfortable. In the meantime, the cellular filling in the chambers 20 tends to increase, compared to a normal tire, the rigidity of the sidewalls 14 in the lateral direction and to oppose therefore the lateral floating of the tire, which is of advantage especially to roadability and to quick response in the change of the direction performed by the driver and to the resistance of lateral strains resulting from the road or from a lateral wind.

In the case of decrease or of loss of pressure in the central chamber arriving for example in the case of perforation of the tread, the tire sags partially by making the sidewalls 14 bend. The wheel is therefore mainly supported by the own vertical rigidity of the partitions 17–18 with the cellular material confined in the chambers 20. The sagging of the tire is therefore limited to a value in the order of 30 to 45% of the height H of the section of the tire and in any case less than 60% of that height H so that the wheel is also supported radially by the sidewalls, at a distance from the top zone 10 with a certain flexibility.

The relatively high lateral rigidity of the sidewalls 14 in the meantime conserves to the tire a sufficient directing power so that the driver still has control of the direction of his vehicle. Finally, the total filling of the lateral chambers 20 and the relatively limited volume of these chambers allow the heating of the cellular material to be maintained at a moderate value so that the tire can continue to assure an almost normal operation.

The cellular material used for the filling of the lateral chambers 20 can be a material having a basis of one of the usual elastomers made cellular by incorporating a blowing (inflating) agent decomposing at the vulcanization temperature of the tire. In order to obtain the filling of the lateral chambers 20 it is therefore enough to insert during the manufacturing of the tire layers a mixture of an elastomer and of an inflating agent between the wall 17 and the partition 18 of the chambers 20. In the course of the later vulcanization of the tire the inflating agent decomposes and forms a material of cellular structure which is expanded by separating the inside partitions 18 and the outside partitions 17 of the lateral chambers from each other so that they will take the form that they have in the finished tire.

An example for the formula for a convenient cellular material is indicated as follows:

| | |
|---|---|
| Natural rubber (smoked leaf) or butadiene-styrene rubber (SBR) | 100 |
| Carbon black | 50 |
| Inflating agent such as azodicarboamide | 7 |
| Polymerization catalyst such as organic peroxide | 0.8 |
| A grafting monomer of such as divinyl benzene | 1.2 |
| Zinc acetate | 2.5 |

Obviously other formulae for cellular material can be used or the elastomer can be replaced by other elastomers, such as for example a terpolymer of ethylene, propylene and diene.

The volume of the bands of the mixture inserted between the walls 17–18 and the grade of the inflating agent of this mixture can be adjusted in order to obtain in the chambers 20 a cellular material having the desired density in order to have its own structural rigidity to support the wheel with a limited sagging of the tire when the central chamber 15 is deflated.

Furthermore, it is preferably intended to obtain a cellular material having statistically a high number of closed cells. It has been noted that when a tire is used without an inner tube placed in the central cavity 15, one can seek for or accept a certain rate of diffusion of the gas occluded in the cells and a certain rate of permeability of the inside partitions 18 of the chambers 20 with the goal to obtain a slow equalization of the pressures between the central chamber 15 and the lateral chambers 20. So, under normal use, the central chamber 15 is inflated to its working pressure with compressed air, a certain quantity of the air can slowly diffuse from this central chamber 15 along the partitions 18 up to a balancing between the pressure of the air in the chamber 15 and the pressure of the gas contained in the cells of the cellular material in the lateral chambers 20. But in the case of a rapid deflating of the central chamber 15, the gas contained in the cells of the cellular material of the lateral chambers 20 conserves for a sufficiently long time a higher pressure and therefore gives to the cellular material its own rigidity that allows it to support the load of the wheel. It is therefore given assurance to see the cellular material in the lateral chambers 20 fulfill its role for safety with respect to the rapid deflating of the central chamber 15 when the vehicle is in operation.

The above-described tire can obviously comprise the usual reinforcing elements such as plies of the carcass as well as elements of special reinforcement in the partitions 17–18 of the lateral chambers. In the example shown in FIG. 1 the carcass is formed by a single tissue ply of "cord" 21 extending to the top under the tread 11 and descending in the inside partitions 18 up to the beads 12, in which the tissue ply is folded around the wires (rods) 22. This ply goes then up into the outside partition 17 up to the shoulders 19. The edges $21_1$, of this ply can extend up into the zone of the top by superimposing each other in the first layer of the ply 21 and eventually they can overlap each other, but since the tire comprises also a top belt 23 under the tread 11 it is generally enough that these edges $21_1$, of this ply of the carcass are detained (fastened) under the lateral parts of belt 23 as it is represented or even underneath the sides (flanks) as can be seen later. This single ply of the carcass could obviously be replaced by two plies of the carcass descending from the top to the beads, and the one extending in the partition 18 and the other in the partition 17. These two plies could extend without interruption from one bead to the other, or else the one or the two could be interrupted in the top zone of the tire. This ply or these plies of the carcass can be of radial cords or of bias cords crossed from the one ply to the other.

In the example shown in FIGS. 1 and 2 the cellular material contained in the lateral chambers 20 is partially covered by flexible reinforcing bands 24–25, for example of tissue placed at the top and at the bottom of the chambers 20. These flexible bands preferably adhere to the cellular material and to the inner surface of the partitions 17 and 18.

Finally profiles or sections of rubber 26 are advantageously provided at the point of the shoulders 19 over the inner side of the carcass 21. When the tire is bending these rubber profiles are deformed and are tending a fling back towards the outside part of the carcass 21 with which they are in contact in order to keep the carcass in the stage of tension. For this the rubber profiles 26 are given a section of a concave-convex form taking up the retractible form of the carcass at the point of the shoulders 19.

The tire represented in FIG. 3 has the same general characteristics and the same elements as the tire described in reference in the FIGS. 1 and 2, except that the inside partitions 18 that separate the lateral chambers 20 filled with flexible cellular material with regard to the central chamber 15 have a noticeably straight form between the shoulders 19 and the beads 12 instead of being convex towards the inside. The carcass 21 is extending in the top zone 10, in the inside partitions 18 and in the beads 12 where its edges $21_2$ are folded around the wires 22 and retained at a low height $h_1$ of the beads instead of extending in the outside partitions 17 of the sidewalls 14. The cellular material contained in the lateral chambers 20 is itself enclosed in a flexible reinforcing band 30, for example of tissue extending at least between this cellular material and the band of the side of rubber forming the outside partitions 17 and the edges $30_1$ of which can be turned down between the material and the inside partitions 18. The flexible band 30 could also completely enclose the cellular material. Preferably, it adheres at the same time to the cellular material and to the inner surface of the chambers 20.

Figure 4:
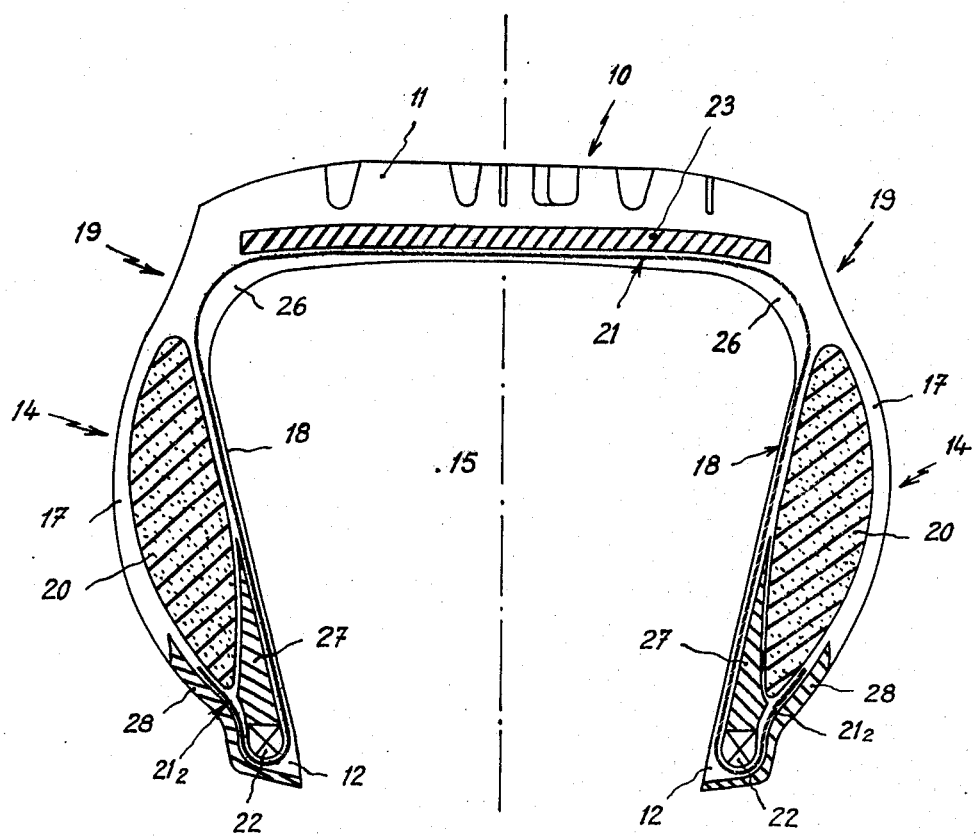

FIG. 4 shows another embodiment of the invention, where the profiles of hard rubber 27 of the filling of the beads extend in the lower part of the inside partitions 18 instead of extending in the outside walls 17 as illustrated in FIGS. 1 to 3. In this case the outer side of the beads 12 is preferably reinforced by hard rubber of the rim 28 rising into the lower part of the outside partitions 17 of the sidewalls. The radially inside part of the chambers 20 is therefore included between the profiles (sections) 27 and 28. These profiles can extend more or less upwardly according to the degree of the lateral stability to be given to the tire.

Another additional disposition of the invention consists in the use in the beads 12 of the tires such as the ones described with wires 22, of flexible material, for example of cables of glass fibers or of cables of aromatic polyamide fibers, as a substitute for the usual steel wire, in order to give to the beads 12 a greater flexibility making the mounting of the tire to the rim easier in spite of the greater stiffness of the sidewalls.

Of course the invention is not limited strictly to the embodiments described, from which one can conceive other embodiments. So can for instance the height $h$ of the lateral chambers vary somewhat, for example between 0.4 and 0.7 times the height H of the section of the tire.

The FIGS. 5 and 6 schematically show the manufacture of tires according to the invention. On a cylindrical drum 40 of a usual manufacturing machine one or several layers of the carcass 21 and layers 41 of the raw elastomer mixture and the inflating agent like the one described earlier are coiled up. Then the edges 21a of the carcass are turned (folded) down around the wires 22 of the beads and then the rubber side bands 17 and the assembly of belt 23 and tread 11 is laid. The tire is then vulcanized in a mold 42 which can be of the classical type. During the molding the tire is pressed against the mold by the vulcanization bag 43 and is heated to vulcanize the rubber. During this operation the layers 41 of the mixture remain compressed between the walls 17 and 18 of the sidewalls, although the inflating agent of the mixture is decomposing by producing embryonic cells in the heart of this mixture. When the vulcanization of the tire is finished the bag 43 is extracted from the tire, since the tire is detached from the mold. The material with the cellular structure 41 can then expand by separating the partitions 17–18, so that they can take up the form illustrated in mixed line that they have in the finished tire.

What is claimed is:

1. A safety tire comprising a tread, spaced beads and sidewalls connecting the beads to the sides of the tread, said sidewalls defining a central inflatable chamber under said tread, each sidewall comprising two spaced walls joining each other at the top and bottom of the sidewall and delimiting therebetween lateral chambers separate from the central inflatable chamber, said lateral chambers being filled with a flexible cellular material that maintains the vertical rigidity of said spaced walls and that renders the sidewalls suitable to support the load of a wheel with a limited sagging of the tire in case of deflation of the central chamber.

2. A tire according to claim 1, in which the cellular flexible material filling the lateral chambers contains a majority of closed cells enclosing a gas.

3. A tire according to claim 1 in which the flexible cellular material filling the lateral chambers is adherent to inner surfaces of the walls defining the lateral chambers.

4. A tire according to claim 1, in which the walls located between and separating the central chamber and the lateral chambers have a slight permeability allowing a slow gaseous diffusion through these walls.

5. A tire according to claim 1 in which the lateral chambers have a radial height $h$ that is between 0.4 and 0.7 times the radial height H of the cross section of the tire.

6. A tire according to claim 1, in which at least one of the walls of the lateral chambers includes layers of reinforcement material.

7. A tire according to claim 6, in which the spaced walls of the lateral chambers are reinforced by a ply of carcass material folded around wires of the beads.

8. A tire according to claim 1, in which the flexible cellular material within the lateral chambers is covered at least partially with at least one flexible reinforcing band.

9. A tire according to claim 8, in which the flexible reinforcing band encloses the cellular material at the top and the bottom of the lateral chambers.

10. A tire according to claim 8, in which only one of the spaced walls of the lateral chambers is reinforced by a layer of the carcass material and a flexible reinforcing band encloses the cellular material at least from the side of the opposite wall to the reinforced spaced wall.

11. A tire according to claim 1, in which the inner spaced walls between the lateral chambers and the central chamber have a convex configuration towards the inside of the tire.

12. A tire according to claim 1, in which the inner walls between the lateral chambers and the central chamber have a straight configuration between the beads and the shoulders of the tire that are adjacent to the sides of the tread.

13. A tire according to claim 1, further comprising shoulders adjacent to the sides of the tread, a reinforcing carcass extending under the tread along each of the sidewalls to a bead, and rubber sections each being placed at a point beneath the shoulders on an inner portion of the carcass of the tire.

14. A tire according to claim 1, in which filling sections of hard rubber extend from the beads to a lower part of an inner spaced wall of each of the lateral chambers.

15. A tire according to claim 5, in which the sidewalls and associated lateral chambers filled with the flexible cellular material have a degree of radial rigidity to limit the sagging of the tire to less than 60% of the height H of the section when the tire is under load and when the central chamber is deflated.

16. A tire according to claim 5, in which the sidewalls having associated lateral chambers filled with a flexible cellular material have a degree of radial rigidity to limit the sagging of the tire to a value on the order of 30 to 45% of that of height H of the section when the tire is under load and when the central chamber is deflated.

17. A tire according to claim 1, in which the beads are reinforced with an annular support of cables of flexible textile material.

18. A tire according to claim 17, in which the flexible textile material is glass fiber or a fiber of an aromatic polyamide.

19. A process for the manufacture of a safety tire having a tread, spaced beads and sidewalls connecting the beads to the sides of the tread, said sidewalls defining a central inflatable chamber under the tread and each sidewall comprising two spaced walls delimiting therebetween lateral chambers, said lateral chambers being filled with a flexible cellular material, which comprises, during the course of the manufacture of the tire on a manufacturing drum, the steps of inserting in the lateral chambers of the sidewalls a layer of elastomeric mixture and an inflating agent and vulcanizing the tire under pressure in a mold heated to obtain at the same time the decomposition of the inflating agent and subsequently the formation and expansion of the cellular material.

* * * * *